United States Patent
Leone, III et al.

(10) Patent No.: US 6,665,587 B2
(45) Date of Patent: Dec. 16, 2003

(54) PRODUCT TEMPLATE FOR A PERSONALIZED PRINTED PRODUCT INCORPORATING WORKFLOW SEQUENCE INFORMATION

(75) Inventors: Anthony J. Leone, III, Pittsford, NY (US); David A. Kavanagh, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/726,109

(22) Filed: Nov. 29, 2000

(65) Prior Publication Data

US 2002/0065578 A1 May 30, 2002

(51) Int. Cl.[7] .............................................. G06F 17/00
(52) U.S. Cl. ...................................... 700/235; 700/233
(58) Field of Search ................................. 700/231, 233, 700/235; 707/104.1, 513, 530, 531; 345/326, 333, 334

(56) References Cited

U.S. PATENT DOCUMENTS

| | | | | |
|---|---|---|---|---|
| 5,056,029 A | * | 10/1991 | Cannon | 700/233 |
| 5,088,586 A | * | 2/1992 | Isobe et al. | 194/205 |
| 5,206,950 A | * | 4/1993 | Geary et al. | 717/109 |
| 5,426,594 A | * | 6/1995 | Wright et al. | 340/7.21 |
| 5,485,568 A | | 1/1996 | Venable et al. | |
| 5,513,117 A | * | 4/1996 | Small | 235/381 |
| 5,561,604 A | * | 10/1996 | Buckley et al. | 347/2 |
| 5,615,123 A | * | 3/1997 | Davidson et al. | 493/458 |
| 5,666,503 A | | 9/1997 | Campanelli et al. | |
| 5,737,729 A | * | 4/1998 | Denman | 700/231 |
| 5,751,590 A | * | 5/1998 | Cannon et al. | 700/233 |
| 5,765,142 A | | 6/1998 | Allred et al. | |
| 5,768,142 A | * | 6/1998 | Jacobs | 700/231 |
| 5,845,302 A | * | 12/1998 | Cyman et al. | 707/517 |
| 5,905,991 A | * | 5/1999 | Reynolds | 715/501.1 |
| 5,918,220 A | * | 6/1999 | Sansone et al. | 235/375 |
| 5,923,556 A | * | 7/1999 | Harris | 700/117 |
| 5,993,048 A | * | 11/1999 | Banks et al. | 700/233 |
| 6,085,126 A | * | 7/2000 | Mellgren, III et al. | |
| 6,141,666 A | * | 10/2000 | Tobin | |
| 6,260,044 B1 | * | 7/2001 | Nagral et al. | 707/102 |
| 6,311,214 B1 | * | 10/2001 | Rhoads | |
| 6,313,835 B1 | * | 11/2001 | Gever et al. | |
| 6,331,861 B1 | * | 12/2001 | Gever et al. | |
| 6,353,772 B1 | * | 3/2002 | Silverbrook | |
| 6,353,898 B1 | * | 3/2002 | Wipfel et al. | 714/48 |
| 6,360,254 B1 | * | 3/2002 | Linden et al. | |

* cited by examiner

*Primary Examiner*—Khoi H. Tran
(74) *Attorney, Agent, or Firm*—Fay, Sharpe, Fagan, Minnich & McKee, LLP

(57) ABSTRACT

A data template for a personalized printed product, where data fields for specific graphical components of the product indicate whether or not these graphical components can be edited and specify an edit order. An application parses the data template and presents the operator with interface screens in a sequence determined by edit order fields. Each interface screen prompts the user to complete the entry of a graphical component.

5 Claims, 4 Drawing Sheets

```
<Product Name="Graduation Card">
  <Page>
    <Surface>
      <Panel>
        <Location X="0.5" Y="0.75" />
        <Dimension Width="4.0" Height="1.0" />
        <Text Editable="Yes" EditOrder="1">
          <Location X="0.25" Y="0.25" />
          <Dimension Width="3.5" Height="0.82" />
          <String>Congratulations</String>
          <Font Name="Arial" Size="0.6" />
          <Color Red="23" Blue="128" Green="212" />
        </Text>
      </Panel>
      <Panel>
        <Location X="2.5" Y="3.0" />
        <Dimension Width="2.0" Height="2.75" />
        <Image Editable="Yes" EditOrder="2">
          <Location X="0.25" Y="0.25" />
          <Dimension Width="1.75" Height="2.25" />
          <Source> http://www.bphotog.com/accts/8838484/78.jpg </Source>
          <Crop X="0.1" Y="0.12" Width="1.8" Height="2.0"/>
        </Image>
      </Panel>
      ...
      ...
      ...
    </Surface>
  </Page>
</Product>
```

*FIG. 2*

PRODUCT TEMPLATE FOR A PERSONALIZED PRINTED PRODUCT INCORPORATING WORKFLOW SEQUENCE INFORMATION

FIELD OF THE INVENTION

This invention relates generally to apparatus for creation and printing of personalized print products and more particularly to a product template for a personalized print product, where the product template incorporates information for controlling the sequence of steps required of an operator of such apparatus.

BACKGROUND OF THE INVENTION

Apparatus for in-store creation of personalized cards and invitations and similar printed products allow a customer to select a suitable design from among a number of available designs and to customize the selected design by specifying the text content or by inputting an image from a scanned photo or other source. Such apparatus typically store each design as a data template. A data template can include such information as size, background, color, text font, index position for customer photo, optional text areas, and similar information. These apparatus typically store multiple templates in a database of some type, as is disclosed in U.S. Pat. Nos. 5,765,142 (Allred et al.) and No. 5,056,029 (Cannon).

To operate an existing apparatus of this type, an operator (usually a customer or a store clerk assisting a customer) selects a product design from a set of displayed options on a display monitor. Once the operator selects a design, the apparatus prompts the operator to enter or select the appropriate text to be inserted at predetermined locations in the design and prompts the operator to scan a photo image (or to input an image from some other source) for display on the card, invitation or other printed product. The sequence of instructions to the operator may be determined in a number of ways, as determined by control logic of the apparatus. With some systems, the operator is presented with a set of available options for selection. The operator can then choose specific text fields to select or to re-enter and can input the scanned image at a suitable point during operation. Or, as is the case with some systems, the operator may automatically be required to scan an image after making a product selection, then enter the text later. These apparatus typically provide a preview display that shows how the final printed product will look.

For a product that consists simply of an image and, possibly, associated text, the sequence of operator entry activity may not be important. However, some printed products can be more complex, offering the option to scan multiple images, or to add or edit text in multiple positions on the printed product. For example, a personalized invitation may be printed in duplex mode and then folded, so that the final product has four, six, or more possible surfaces for accepting text and images. For a more complicated product such as this, an inexperienced operator may easily become confused and, for example, omit entry of one or more text fields. Or, an operator may be confused as to the intended placement for a scanned photo or other image input.

An important consideration for companies that market and support systems for preparing these personalized printed products is the reaction of the customer to the system and to the overall experience of preparing the end-product. If a system successfully guides an operator through the preparation steps, there is greater likelihood of success and a higher chance that the customer will return to the system at a later date, to use other products and services.

Conventional systems for preparation of personalized printed products may control the image and text entry sequence directly from the application logic that runs the display, setup, and print preparation process. With such a method, the operator's workflow sequence is not flexible and is determined by an application programmer. A template designer would be required to specify an entry sequence to the application programmer so that a particular release of the product would incorporate the desired operation sequence. The sequence could then only be changed by an applications programmer, not by a designer. A new release of software for the product would be required if it were determined to be desirable to change the operator workflow.

Or, the sequence of operator activity may be fully controlled by the operator, such as by clicking on the area of interest on the display screen. However, this method can cause some confusion, particularly with a more complex invitation or greeting card.

Other alternate methods known in the art employ a separate file that guides the workflow, controlling the sequence of operations by which an operator proceeds from one screen to the next. Here, however, a separate file must be set up to control the workflow function.

With existing systems, it is not feasible for an end-product designer to easily add a new design and to dictate to the system the sequence in which an operator should be required to enter text or select or scan images. U.S. Pat. No. 5,765, 142 describes a complex set of modules that allow setting up a new product and setting up a new sequence for operator entry procedures in order to create this product. However, there are multiple steps required in the '142 patent and there is no single mechanism provided by which a new product and its sequence can be easily specified or by which the operation sequence for creating an existing product can be readily modified.

Among available methods that can be used to define a product template are a number of page-definition languages and standards for data presentation. The most promising of these standards in current use is XML (Extensible Markup Language), which is the result of an adaptation of the fully featured SGML, specifically adapted to represent data, including documents. XML allows a designer to define specific components for a document, and to define how these components are displayed and to specify valid data fields for each component. To contain the set of definitions for individual data elements, XML uses a Data Type Dictionary (DTD) that defines valid fields. This arrangement allows widespread use of a document published using XML. Using an XML file and its associated DTD, an application can then determine how to publish the XML data.

It can therefore be seen that there is a need for a mechanism that allows a designer to specify a new product for a system that creates personalized printed products and to specify the sequence of operations used for setting up the product.

SUMMARY OF THE INVENTION

With this goal in view, the present invention provides a product template that incorporates workflow sequencing for a personalized printed product and a method of using such a product template.

A feature of the present invention is the use of specific fields in a product template that specify, for an individual graphical component of the product template, the preferred sequence of entry of any visual graphical component of the template, such as text, image data, line art (such as circle, polygon, or rectangle) or selection of a graphical component.

It is an advantage of the present invention that it uses a standard page layout definition with customization to incorporate information on the editability and preferred edit order for graphical components.

It is a further advantage of the present invention that it allows construction of a page layout definition for a new personalized printed product without requiring modification to the printing application. At the same time, the page layout definition instructs the application as to the preferred entry order for text or graphical components.

It is a related advantage of the present invention that it allows a designer of a personalized printed product a measure of control over the experience of product creation. Products having a measure of emotional value to the end-customer can thus be created using a designed set of procedures that are selected so as to optimize the overall experience of the end-customer in using a system.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

FIG. 2 shows sample XML code in a product template that defines two of the graphical components of the product illustrated in FIG. 1;

DETAILED DESCRIPTION OF THE PREFERRED EMBODIMENTS

The generic phrase "personalized printed product", generally numbered 10 in the following description, is used to encompass the output of a system designed to produce any of a number of types of printed output products such as the following:

Greeting cards;
Invitations;
Calendars;
Announcements;
Business materials (for example, sales sheets, real estate brochures, and the like).

The generic term "graphical component" generally refers to any graphical object that is incorporated in the layout of a personalized printed product. Graphical components can include such objects as text strings, scanned images, or "canned" graphics such as borders and backgrounds, as well as clip art, syndicated cartoon characters, and the like.

Figure 1:
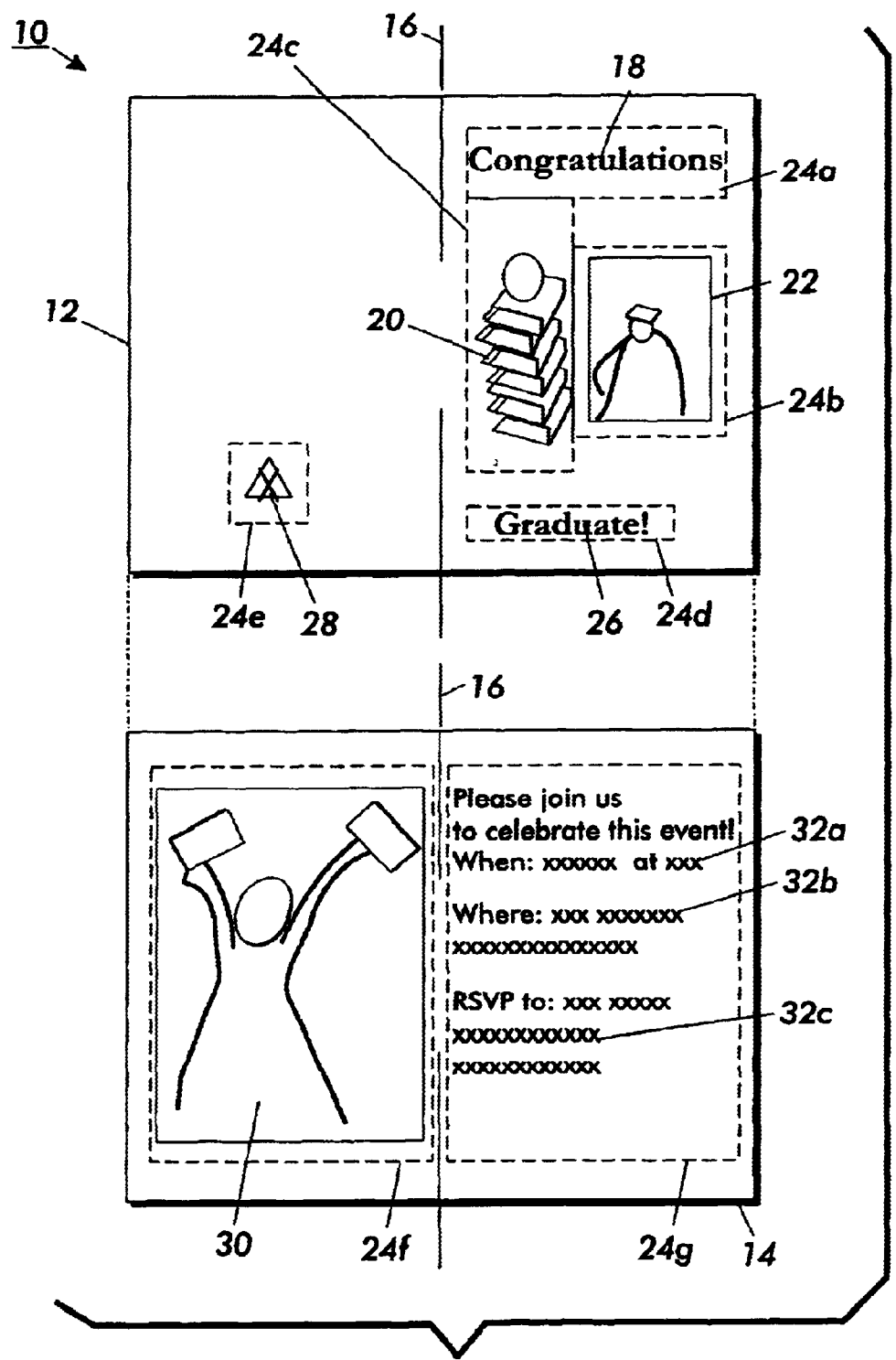
FIG. 1 shows a personalized printed product created using a template of the present invention.

FIG. 1 shows a personalized printed product 10 having a number of graphical components. Here, product 10 is an invitation that prints on a front side 12 and a back side 14 of a single sheet ("duplex" printing). A fold line 16 indicates how the card is finished after being printed. A text heading 18 provides a standard message of purpose. A canned graphic 20 depicts a suitable theme to support the overall message. A customer image 22 is typically scanned from a photograph (but alternately from a slide or negative, a digital camera image, an image stored on CD-ROM or diskette, or an image provided as input in digitized form).

Within the product layout, the lowest-level container is a rectangular panel 24a/b/c/d/e/f/g. Text, art, or image graphical components are placed in panels 24a/b/c/d/e/f/g. For example:

panel 24a contains text heading 18;
panel 24b contains customer image 22;
panel 24c contains canned graphic 20;
panel 24d contains a message 26;
panel 24e contains a logo 28;
panel 24f contains an inside customer image 30;
panel 24g contains fill-in text graphical components 32a/b/c.

Some elements of the layout cannot be varied. As one example, logo 28 must appear on each product and is, therefore, not considered "editable". However, in most cases it is desirable to allow text elements to be editable. For example, a customer may want to customize text heading 18 or a message 26 appearing on product 10. Similarly, a customer may want to select a different canned graphic 20 from a listing of available graphics available on the system. This listing could be available in a menu displayed on the screen, for example.

Figure 3:
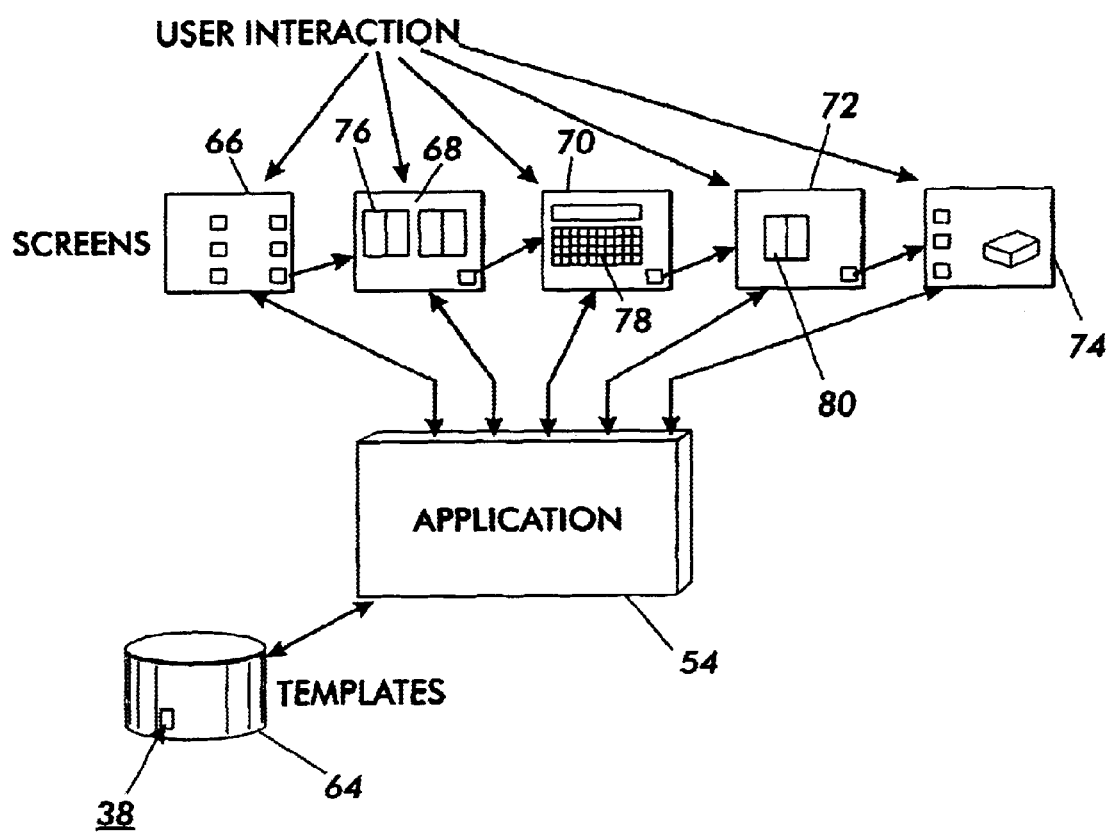
FIG. 3 is a block diagram showing the relationship of operator interaction and the application for a partial sequence of screens that guide operator interaction with the system, using a template of the present invention.

Editable graphical components can be specified in an XML template, rather than in an application program. FIG. 2 shows a portion of an XML product template 38 that describes personalized printed product 10 shown in FIG. 1. FIG. 3 then shows how an application 54 uses product template 38 from a templates database 64 in order to control the sequence of screens 66/68/70/72/74 used for operator interaction.

Referring to FIG. 2, a product definition is bounded by Product fields 40a and 40b. A page definition, defining what goes on a sheet of paper output, is bounded by Page fields 42a and 42b. Surface fields 44a and 44b bound the graphical components that go on front side 12 or back side 14. Panel fields 46a/46b and 48a/48b bound the definition for panels 24a and 24b, respectively, as were shown in FIG. 1.

The definition for panel 24a, bounded by fields 46a and 46b, comprises a data segment giving expected information defining location and dimensions for this rectangular area. Text fields 50a and 50b bound the definition for text appearing in panel 24a. As these fields show, the definition includes the text string along with specification of font, size and color, and location. Two fields are of special interest, as follows:

(1) An Editable field 52 defines the text string as editable. This definition instructs application 54 to allow the operator to edit text heading 18.

(2) An EditOrder field 56 defines the preferred order for editing of this field by the operator. Application 54 uses this data to determine the workflow sequence for determining the operational sequence needed to produce personalized printed product 10.

In similar fashion, Image fields 58a and 58b bound the definition for customer image 22 contained in panel 24b. The image definition includes the standard fields listing image source, dimensions, and location within panel 24b. Editable field 60 indicates that the text image can be modified. EditOrder field 62 indicates the order in which application 54 will prompt the operator for entering (typically, for scanning) and setting up customer image 22.

Returning to FIG. 3, provided is a more detailed discussion of how application 54 uses product template 38 from a templates database 64 in order to direct the overall sequence of user interaction. Application 54 consists of a software program that can run on a standard computer (not shown), such as any conventional desktop computer that is used for imaging by controlling a print scanner (to accept an input image) and driving an output printer. Such a computer may be specially configured as a card-creation workstation, for example, as is described in U.S. Pat. Nos. 5,765,142 and 5,056,029.

Operation begins when a user selects personalized printed product 10 from screen 66. In response, application 54 displays a thumbnail view 64 of personalized printed product 10. Application 54 then accesses templates database 64 to use product template 38 product data. Templates database 64 could be implemented using a database product (such as ORACLE Database software from Oracle Corporation, Redwood Shores, Calif.) or could simply be implemented as part of a structured file system where directories contain multiple product template 38 files.

Using the example of FIG. 2, application 54 parses the XML code that forms product template 38 and identifies the first editable graphical component of personalized printed product 10 in sequence. Here, text heading 18 is editable and has Order="1". When the operator confirms the selection based on thumbnail view 64, application 54 then presents a text editing interface 78 that allows the operator to edit the text of text heading 18. Text editing interface 78 may be, for example, a keyboard touchscreen or may provide a menu listing of "canned" text for substitution of the default "Congratulations" text provided in text heading 18.

Continuing with the sequence shown in FIG. 3, once the user has entered the desired text on screen 70, application 54 then displays, on screen 72, a preview 80 showing the newly entered text heading 18 in position on a display of personalized printed product 10. Application 54 then parses product template 38 to identify the next editable graphical component in sequence. From the example of FIG. 2, customer image 22 is editable and has EditOrder="2". Application 54 then presents the user with options for image entry on screen 74. Image entry options may include using a print scanner for a photograph, using a scanner for negatives or slides, or selecting a digital image file from diskette, CD-ROM or other source.

The sequence begun as shown in FIG. 3 then continues for each graphical component of personalized printed product 10 that has a field indicating Editable="Yes". Application 54 takes each editable graphical component in sequence and presents the user with one or more interface screens that allow the user to specify or enter the desired graphical component in order to create personalized printed product 10.

The above description illustrates how application 54 uses the XML file shown in FIG. 2 to control the sequence for user interaction when creating personalized printed product 10 as illustrated in FIG. 1. This sequence allows a number of modifications, all within the scope of this invention. For example:

(a) Text input can be performed in a number of alternate ways. FIG. 2 shows text editing interface 78 as an on-screen keyboard. Text could alternately be entered directly from a keyboard connected to the computer that runs application 54. Or, text could be selected using a menu utility that lists alternate text entries.

(b) The EditOrder field could be optional, allowing application 54 to conduct the sequence of user interaction by following the order of appearance of editable fields in product template 38 or using some other default order.

(c) XML is an ideal candidate language for template 38 setup. However, this invention could also be implemented using another suitable structured document format.

(d) Application 54 and templates database 64 could be on the same computer. Alternately, application 54 and templates database 64 could be on different computers, accessible to each other over a network. Application 54 could be a Java applet, downloaded to a networked computer that has a Java interpreter.

Application 54 can use any of a number of well-known methods for parsing template 38 and ordering the presentation of individual interface screens to the user. In a preferred embodiment, application 54 parses template 38 in order to create a doubly-linked list of objects, each object representing a graphical component on personalized printed product 10. Objects are ordered within the list by their assigned Order number. Application 54 then traverses the list of objects in order to present them to the user for completion. Because this list of objects is doubly-linked, the user can easily move forward or backward through the sequence of graphical components to be entered, edited, or scanned. Objects having Order values assigned in template 38 have precedence over objects that do not have an Order assignment. Objects not having an Order assignment are processed in the order in which their corresponding graphical components are listed in template 38.

Figure 4:
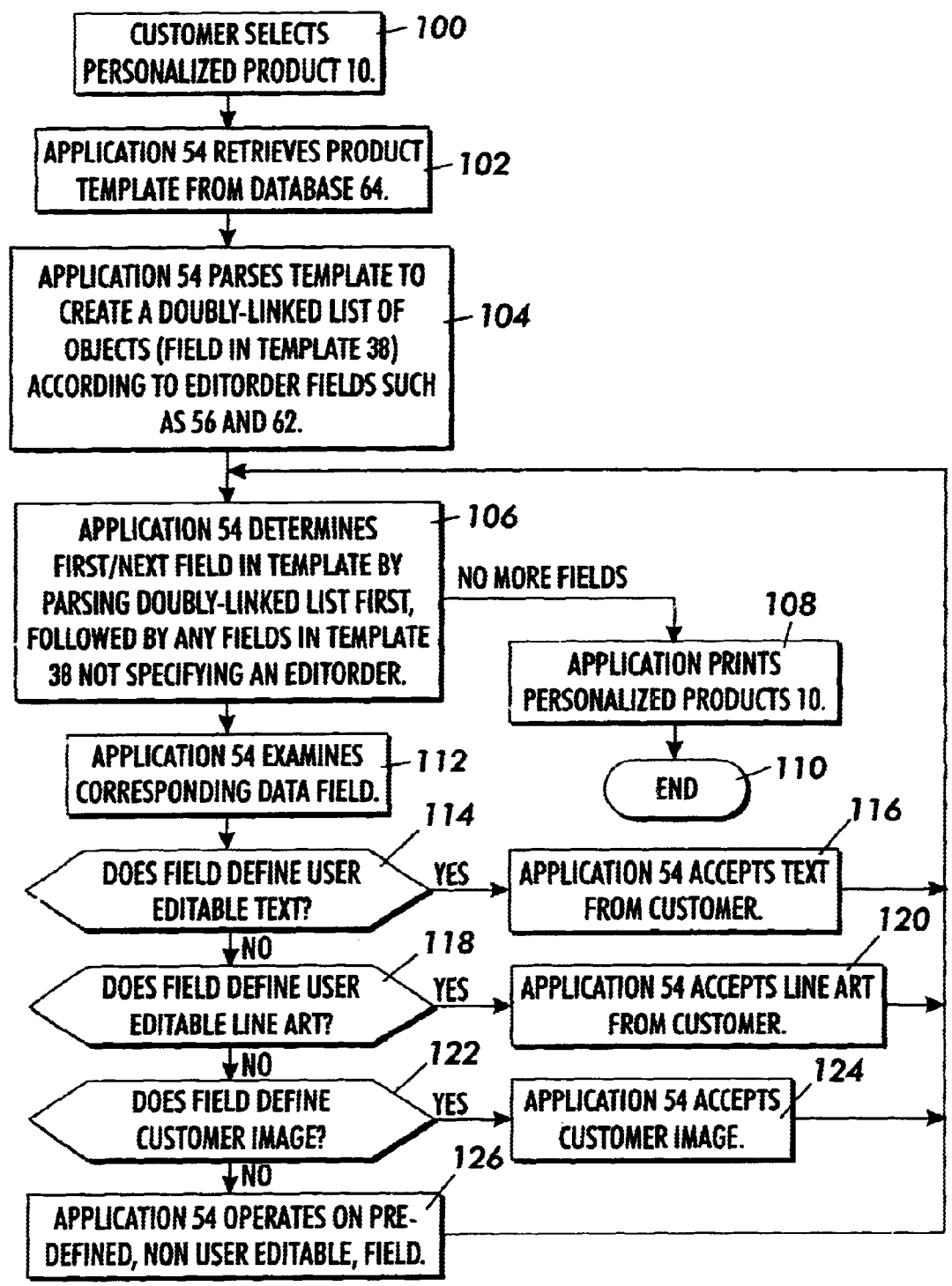
FIG. 4 is a flowchart illustrating the operation of one embodiment for generating a personalized printed product.

FIG. 4 is a flow chart illustrating the operation of one embodiment of an apparatus for preparing a personalized printed product comprising a single page. Operation for a multi-page product would be similar but is not shown in the flow chart in order to simplify the flow chart. As a further simplification for this flow chart, it is assumed that the customer proceeds in the recommended order for processing objects in template 38.

In step 100, a customer selects a personalized product bounded by product fields 40a and 40b. At step 102, having received a selection choice from the customer, application 54 retrieves a product template 38 from templates database 64. At step 104, application 54 parses template 38 and creates a doubly-linked list comprising pointers to panels in template 38 containing an EditOrder field such as fields 56 and 62 for example. At step 106, application 54 finds the first, or next, panel field in template 38 by parsing the doubly-linked list first, followed by any panel fields in template 38 not specifying an EditOrder. When no more panel fields are found in the template, application 54 proceeds to step 108 where the personalized product is printed. The apparatus is then returned to a standby state at end step 110.

However, when an unprocessed panel field is found, application program 54 continues processing at step 112 where the corresponding field is examined. At step 114, application 54 determines whether the panel requires customer text input such as field 56 for example. If text is to be received, processing proceeds to step 116 where text is received from the customer, and application 54 returns iteratively to step 106 to search for the next pair of panel fields (46a,46b,48a,48b). Otherwise, at step 118, application 54 determines whether the panel requires customer line art input. If line art is to be received, processing proceeds to step 120 where line art is accepted from the customer, and application 54 returns iteratively to step 106 to search for the next pair of panel fields (46a,46b,48a,48b). If application 54 finds the selected field does not require either text or line art from the customer, it next determines if a customer image is to be received at step 122. If so, at step 124, a customer image is received from the customer, and again application 54 returns iteratively to step 106 to search for the next pair of panel fields (46a,46b,48a,48b).

At this point when the field has been found not to be user-editable, at step 126, application 54 performs any required pre-defined operations on the field and returns to step 106 for continued processing of remaining panel fields It can be observed from the above description of the flow chart in FIG. 4 that the sequence of events as seen by the customer, the order in which the customer is prompted for information, is not rigid or fixed by design of the apparatus. Instead, the sequence of events is determined by the author of each personalized product template, and can be specified to occur in a logical order relative to the design of each product. This invention allows a designer of a greeting card, for example, to influence the sequence of operations by which a customer personalizes the card's message and image content. This gives a greeting card designer some control of the customer "experience" in creating the card, serving the goal of involving a customer creatively, optimizing customer enjoyment.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, we hereby claim:

1. A method for defining a personalized printed product that consists of a plurality of graphical components, said method comprising the steps of:
   (a) providing a data template that describes each graphical component of the personalized printed product as panel fields;
   (b) encoding, within said data template, an order field indicative of the preferred order in which each graphical compenent is to be modified;
   (c) parsing the data template to create a double-linked list, including pointers to panel fields in the data template;
   (d) finding a first panel field in the data template by parsing the doubly-linked list;
   (e) determining whether the first panel field requires input by a user of at least one of text, line art or a user image;
   (f) entering by the user at least one of the text, line art or user image;
   (g) finding the next panel field in the data template by parsing the doubly-linked list;
   (h) determining whether the next panel field requires input by the user of at least one of text, line art or a user image;
   (i) entering by the user at least one of the text, line art or user image;
   (j) repeating steps, g, h and i until no further panel fields with an order field are found;
   (k) operating on pre-defined, non-editable panel fields; and
   (l) printing the personalized printed product when no additonal panel fields are found.

2. The method of claim 1 wherein said graphical components comprise customer images, text and line art.

3. The method of claim 1 wherein said user can optionally override said preferred order.

4. The method of claim 1 wherein said data template is provided in XML language.

5. The method according to claim 1 wherein the step of encoding the order field is alterable independent of the location of the component fields in the template.

* * * * *